(12) United States Patent
Leen et al.

(10) Patent No.: US 8,556,691 B2
(45) Date of Patent: *Oct. 15, 2013

(54) SYSTEM AND METHOD FOR ADDING A SKILL ASPECT TO GAMES OF CHANCE

(75) Inventors: Fergus A. Leen, Wimbledon Park (GB); Sam B. Lawrence, London (GB); David G. McNally, Wimbledon (GB); Clive Hetherington, Huddersfield (GB); David M. McDowell, London (GB); Kevin R. O'Neal, London (GB)

(73) Assignee: Cantor Gaming Limited, New York, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/361,255

(22) Filed: Jan. 30, 2012

(65) Prior Publication Data

US 2012/0252546 A1 Oct. 4, 2012

Related U.S. Application Data

(63) Continuation of application No. 11/397,596, filed on Apr. 3, 2006, now Pat. No. 8,105,141, which is a continuation of application No. 10/193,817, filed on Jul. 12, 2002, now Pat. No. 7,021,623.

(60) Provisional application No. 60/305,148, filed on Jul. 13, 2001.

(51) Int. Cl.
*G06F 17/00* (2006.01)
*A63F 9/24* (2006.01)
*A63F 3/00* (2006.01)
*A63B 71/00* (2006.01)

(52) U.S. Cl.
USPC ............... 463/1; 463/9; 273/138.1; 273/237; 273/243

(58) Field of Classification Search
USPC ........ 463/1, 9–11, 47; 273/138.1, 138.2, 146, 273/166, 234, 237, 242, 243, 246, 248, 249
See application file for complete search history.

(56) References Cited

U.S. PATENT DOCUMENTS

| | | |
|---|---|---|
| 2,026,082 A | 12/1935 | Darrow |
| 3,224,773 A | 12/1965 | Roed |

(Continued)

FOREIGN PATENT DOCUMENTS

| | | |
|---|---|---|
| EP | 1658887 | 5/2006 |
| GB | 2262642 | 6/1993 |

(Continued)

OTHER PUBLICATIONS

PCT Report for PCT/EP02/07806 dated Jan. 2, 2003 (6 pages).

(Continued)

*Primary Examiner* — David L Lewis
*Assistant Examiner* — Robert Mosser
(74) *Attorney, Agent, or Firm* — Thomas D. Bradshaw (57) ABSTRACT

In various embodiments, a predetermined number of move numbers for one or more players or users of a game or application may be determined, e.g., using an indicator. For example, a first group of move numbers for a first player and a second group of move numbers for a second player may be determined. The players use the pre-established move numbers to advance according to the rules of the application or game. Move numbers within a group may be sequenced or non-sequenced. Move numbers may be replaced at each player's turn or when all or a subset of move numbers of a group are used. Move numbers may be established by any type of indicator such as dice, dominos, or a random number generator. In some embodiments, move numbers may be traded in. Move numbers may or may not be visible at predetermined times to one or more players.

31 Claims, 3 Drawing Sheets

(56) References Cited

U.S. PATENT DOCUMENTS

| | | |
|---|---|---|
| 4,141,548 A | 2/1979 | Everton |
| 4,339,798 A | 7/1982 | Hedges et al. |
| 4,592,546 A | 6/1986 | Fascenda et al. |
| 4,883,636 A | 11/1989 | Fantle, Jr. |
| 5,141,234 A | 8/1992 | Boylan et al. |
| 5,179,517 A | 1/1993 | Sarbin et al. |
| 5,573,244 A | 11/1996 | Mindes |
| 5,575,474 A | 11/1996 | Rossides |
| 5,669,817 A | 9/1997 | Tarantino |
| 5,676,375 A | 10/1997 | Pirouzkhah |
| 5,749,785 A | 5/1998 | Rossides |
| 5,769,714 A | 6/1998 | Wiener et al. |
| 5,826,976 A | 10/1998 | Skratulia |
| 5,828,843 A | 10/1998 | Grimm et al. |
| 5,842,921 A | 12/1998 | Mindes et al. |
| 5,868,392 A | 2/1999 | Kraft |
| 5,879,007 A | 3/1999 | Kasri |
| 5,911,419 A | 6/1999 | Delaney et al. |
| 5,934,675 A | 8/1999 | Handelman et al. |
| 5,944,315 A | 8/1999 | Mostashari |
| 5,947,821 A | 9/1999 | Stone |
| 5,971,854 A | 10/1999 | Pearson et al. |
| 6,007,427 A | 12/1999 | Wiener et al. |
| 6,036,601 A | 3/2000 | Heckel |
| 6,062,565 A | 5/2000 | Chadband et al. |
| 6,068,552 A | 5/2000 | Walker |
| 6,070,878 A | 6/2000 | Jones et al. |
| 6,102,403 A | 8/2000 | Kaufman |
| 6,120,031 A | 9/2000 | Adams |
| 6,135,453 A | 10/2000 | Srichayaporn |
| 6,146,272 A | 11/2000 | Walker et al. |
| 6,158,741 A | 12/2000 | Koelling |
| 6,174,235 B1 | 1/2001 | Walker et al. |
| 6,204,813 B1 | 3/2001 | Wadell et al. |
| 6,206,373 B1 | 3/2001 | Garrod |
| 6,227,969 B1 | 5/2001 | Yoseloff |
| 6,305,689 B1 | 10/2001 | Webb |
| 6,325,716 B1 | 12/2001 | Walker et al. |
| 6,341,778 B1 | 1/2002 | Lee |
| 6,371,485 B1 | 4/2002 | Daines |
| 6,402,149 B1 | 6/2002 | Chou |
| 6,434,398 B1 | 8/2002 | Inselberg |
| 6,439,573 B1 | 8/2002 | Sklar |
| 6,460,848 B1 | 10/2002 | Soltys et al. |
| 6,464,583 B1 | 10/2002 | Kidron |
| 6,485,020 B1 | 11/2002 | Broadnax |
| 6,503,145 B1 | 1/2003 | Webb |
| 6,508,710 B1 | 1/2003 | Paravia et al. |
| 6,520,856 B1 | 2/2003 | Walker et al. |
| 6,523,829 B1 | 2/2003 | Walker et al. |
| 6,536,767 B1 | 3/2003 | Keller |
| 6,536,769 B1 | 3/2003 | Palacios et al. |
| 6,540,230 B1 | 4/2003 | Walker et al. |
| 6,561,902 B1 | 5/2003 | Walker et al. |
| 6,569,014 B2 | 5/2003 | Walker et al. |
| 6,569,015 B1 | 5/2003 | Baerlocher et al. |
| 6,575,465 B2 | 6/2003 | Lo |
| 6,601,048 B1 | 7/2003 | Gavan et al. |
| 6,612,580 B1 | 9/2003 | Weldon |
| 6,616,142 B2 | 9/2003 | Adams |
| 6,679,497 B2 | 1/2004 | Walker et al. |
| 6,692,003 B2 | 2/2004 | Potter et al. |
| 6,708,975 B1 | 3/2004 | Fox et al. |
| 6,733,387 B2 | 5/2004 | Walker et al. |
| 6,755,420 B2 | 6/2004 | Colton |
| 6,769,986 B2 | 8/2004 | Vancura |
| 6,808,174 B1 | 10/2004 | Rubin |
| 6,877,745 B1 | 4/2005 | Walker et al. |
| 6,910,965 B2 | 6/2005 | Downes |
| 6,929,264 B2 | 8/2005 | Huard et al. |
| 7,004,834 B2 | 2/2006 | Walker et al. |
| 7,022,015 B2 | 4/2006 | Mostashari |
| 7,086,943 B2 | 8/2006 | Mugnolo et al. |
| 7,094,151 B2 | 8/2006 | Downes |
| 7,172,508 B2 | 2/2007 | Simon et al. |
| 7,306,514 B2 | 12/2007 | Amaitis et al. |
| 7,361,085 B2 | 4/2008 | Packes, Jr. et al. |
| 7,410,422 B2 | 8/2008 | Fine |
| 7,523,941 B2 | 4/2009 | Thomas et al. |
| 7,585,217 B2 | 9/2009 | Lutnick et al. |
| 7,833,101 B2 | 11/2010 | Lutnick et al. |
| 2001/0044339 A1 | 11/2001 | Cordero et al. |
| 2002/0058543 A1 | 5/2002 | Walker et al. |
| 2002/0068633 A1 | 6/2002 | Schlaifer |
| 2002/0072412 A1 | 6/2002 | Young et al. |
| 2002/0125639 A1 | 9/2002 | Wells |
| 2003/0060276 A1 | 3/2003 | Walker et al. |
| 2003/0064807 A1 | 4/2003 | Walker et al. |
| 2003/0067116 A1 | 4/2003 | Colton |
| 2003/0119579 A1 | 6/2003 | Walker et al. |
| 2003/0139211 A1 | 7/2003 | Mostashari |
| 2003/0144052 A1 | 7/2003 | Walker et al. |
| 2004/0005919 A1 | 1/2004 | Walker et al. |
| 2004/0104845 A1 | 6/2004 | McCarthy |
| 2004/0227291 A1 | 11/2004 | Van Rhyn |
| 2004/0231018 A1 | 11/2004 | Olson |
| 2004/0259621 A1 | 12/2004 | Pfeiffer et al. |
| 2005/0040592 A1 | 2/2005 | Adams, III |
| 2005/0051958 A1 | 3/2005 | Snow |
| 2005/0059452 A1 | 3/2005 | Hartl |
| 2005/0082756 A1 | 4/2005 | Duncan |
| 2005/0113161 A1 | 5/2005 | Walker et al. |
| 2005/0116416 A1 | 6/2005 | Peterson |
| 2005/0127607 A1 | 6/2005 | Centrone |
| 2005/0151319 A1 | 7/2005 | Berman et al. |
| 2005/0179201 A1 | 8/2005 | DeSalvo |
| 2005/0227757 A1 | 10/2005 | Simon |
| 2005/0275166 A1 | 12/2005 | Wirth |
| 2006/0017228 A1 | 1/2006 | Chen |
| 2006/0025192 A1 | 2/2006 | Walker et al. |
| 2006/0052148 A1 | 3/2006 | Blair, Jr. et al. |
| 2006/0079314 A1 | 4/2006 | Walker et al. |
| 2006/0079316 A1 | 4/2006 | Flemming et al. |
| 2006/0084501 A1 | 4/2006 | Walker et al. |
| 2006/0246990 A1 | 11/2006 | Downes |
| 2007/0135214 A1 | 6/2007 | Walker et al. |
| 2007/0135215 A1 | 6/2007 | Walker et al. |
| 2007/0155462 A1 | 7/2007 | O'Halloran et al. |
| 2007/0191107 A1 | 8/2007 | Walker et al. |
| 2007/0254732 A1 | 11/2007 | Walker et al. |
| 2007/0293289 A1 | 12/2007 | Loeb |
| 2007/0298856 A1 | 12/2007 | Gilmore et al. |
| 2008/0058048 A1 | 3/2008 | Lutnick et al. |
| 2008/0070667 A1 | 3/2008 | Lutnick et al. |
| 2008/0076544 A1 | 3/2008 | Mindes et al. |
| 2008/0085769 A1 | 4/2008 | Lutnick et al. |
| 2008/0113816 A1 | 5/2008 | Mahaffey et al. |
| 2008/0161101 A1 | 7/2008 | Lutnick et al. |
| 2008/0191418 A1 | 8/2008 | Lutnick et al. |
| 2008/0207310 A1 | 8/2008 | Mindes |
| 2008/0214286 A1 | 9/2008 | Lutnick et al. |
| 2008/0248849 A1 | 10/2008 | Lutnick et al. |
| 2008/0254881 A1 | 10/2008 | Lutnick et al. |
| 2009/0061974 A1 | 3/2009 | Lutnick et al. |
| 2009/0061978 A1 | 3/2009 | Ahlin |
| 2009/0088232 A1 | 4/2009 | Amaitis et al. |
| 2009/0093300 A1 | 4/2009 | Lutnick et al. |
| 2009/0111551 A1 | 4/2009 | Faulkner |
| 2009/0291732 A1 | 11/2009 | Lutnick et al. |
| 2010/0048302 A1 | 2/2010 | Lutnick et al. |
| 2010/0087247 A1 | 4/2010 | Joshi et al. |
| 2010/0105464 A1 | 4/2010 | Storm et al. |
| 2010/0124960 A1 | 5/2010 | Lutnick et al. |
| 2010/0124967 A1 | 5/2010 | Lutnick et al. |
| 2010/0160012 A1 | 6/2010 | Amaitis et al. |
| 2011/0034228 A1 | 2/2011 | Lutnick et al. |
| 2011/0065490 A1 | 3/2011 | Lutnick et al. |
| 2011/0275432 A1 | 11/2011 | Lutnick et al. |

(56) References Cited

U.S. PATENT DOCUMENTS

| | | |
|---|---|---|
| 2012/0058813 A1 | 3/2012 | Amaitis et al. |
| 2012/0064969 A1 | 3/2012 | Uchibori |

FOREIGN PATENT DOCUMENTS

| | | |
|---|---|---|
| WO | WO 97/44105 | 5/1997 |
| WO | WO 9851384 | 11/1998 |
| WO | WO 99/26204 | 5/1999 |
| WO | WO 00/32286 | 6/2000 |
| WO | WO 00/79464 | 12/2000 |
| WO | WO 01/05477 | 1/2001 |
| WO | WO 01/01319 | 4/2001 |
| WO | WO 01/41447 | 6/2001 |
| WO | WO 02/060546 | 8/2002 |
| WO | WO 2004/076011 | 9/2004 |

OTHER PUBLICATIONS

PCT Search Report for PCT/EP02/07807 dated Apr. 10, 2003 (7 pages).
PCT Written Opinion for PCT/EP02/07807 dated Apr. 22, 2003 (5 pages).
USPTO Office Action for U.S. Appl. No. 10/194,358, Mar. 25, 2004 (7 pages).
USPTO Examiner Interview Summary for U.S. Appl. No. 10/194,358, Jun. 17, 2004 (3 pages).
USPTO Notice of Allowance and Fees Due for U.S. Appl. No. 10/194,358, Jan. 26, 2005 (4 pages).
USPTO Office Action for U.S. Appl. No. 10/193,971, Mar. 26, 2004 (8 pages).
USPTO Notice of Allowance and Fees Due for U.S. Appl. No. 10/193,971, Dec. 15, 2004 (4 pages).
USPTO Office Action for U.S. Appl. No. 10/194,018, Apr. 23, 2004 (7 pages).
USPTO Notice of Allowance and Fees Due for U.S. Appl. No. 10/194,018, Dec. 15, 2004 (4 pages).
USPTO Office Action for U.S. Appl. No. 10/193,817, Nov. 18, 2003 (5 pages).
USPTO Office Action for U.S. Appl. No. 10/193,817, Mar. 25, 2004 (11 pages).
USPTO Examiner Interview Summary for U.S. Appl. No. 10/193,817, May 24, 2004 (3 pages).
USPTO Examiner Interview Summary for U.S. Appl. No. 10/193,817, Oct. 18, 2004 (3 pages).
USPTO Office Action for U.S. Appl. No. 10/193,817, Oct. 18, 2004 (11 pages).
USPTO Office Action for U.S. Appl. No. 10/193,817, Jan. 10, 2005 (2 pages).
USPTO Office Action for U.S. Appl. No. 10/193,817, Apr. 7, 2005 (21 pages).
USPTO Examiner Interview Summary for U.S. Appl. No. 10/193,817, Aug. 1, 2005 (4 pages).
USPTO Notice of Allowance and Fees Due for U.S. Appl. No. 10/193,817, Oct. 31, 2005 (7 pages).
John Scarne—Scarne'S Encyclopedia of Games—1973—Harper & Row—pp. 522-531.
John Belton—Domino Games—1931—Raintree Editions—pp. 7-10.
USPTO Office Action for U.S. Appl. No. 10/193,980, Dec. 23, 2005 (9 pages).
USPTO Examiner Interview Summary for U.S. Appl. No. 10/193,980, Mar. 29, 2006 (4 pages).
USPTO Office Action for U.S. Appl. No. 10/193,980, Mar. 7, 2007 (12 pages).
USPTO Office Action for U.S. Appl. No. 10/193,980, Jun. 28, 2007 (3 pages).
USPTO Office Action for U.S. Appl. No. 10/193,980, Sep. 25, 2007 (5 pages).
USPTO Office Action for U.S. Appl. No. 10/193,980, Dec. 11, 2007 (10 pages).
USPTO Office Action for U.S. Appl. No. 10/193,980, Jun. 30, 2008 (13 pages).
USPTO Office Action for U.S. Appl. No. 10/193,980, Sep. 10, 2008 (3 pages).
USPTO Office Action for U.S. Appl. No. 11/335,253, Sep. 14, 2007 (11 pages).
USPTO Office Action for U.S. Appl. No. 11/335,253, Mar. 21, 2008 (10 pages).
USPTO Office Action for U.S. Appl. No. 11/335,253, Jun. 11, 2008 (3 pages).
USPTO Office Action for U.S. Appl. No. 11/334,848, Aug. 15, 2007 (12 pages).
USPTO Office Action for U.S. Appl. No. 11/334,848, May 16, 2008 (5 pages).
USPTO Office Action for U.S. Appl. No. 12/131,516, Jul. 8, 2009 (12 pages).
USPTO Examiner Interview Summary for U.S. Appl. No. 12/131,516, Nov. 9, 2009 (3 pages).
USPTO Office Action for U.S. Appl. No. 11/335,210, Sep. 6, 2007 (24 pages).
USPTO Office Action for U.S. Appl. No. 11/335,210, Jan. 23, 2008 (9 pages).
USPTO Office Action for U.S. Appl. No. 11/335,210, Apr. 4, 2008 (3 pages).
USPTO Office Action for U.S. Appl. No. 10/193,978, Mar. 31, 2004 (7 pages).
USPTO Office Action for U.S. Appl. No. 10/193,978, Dec. 14, 2004 (10 pages).
USPTO Office Action for U.S. Appl. No. 10/193,978, Jan. 25, 2005 (3 pages).
Uspto Notice of Allowance and Fees Due for Application No. 10/193978, Nov. 30, 2005 (6 pages).
USPTO Office Action for U.S. Appl. No. 10/193,977, Apr. 21, 2004 (8 pages).
USPTO Notice of Allowance and Fees Due for U.S. Appl. No. 10/193,977, Dec. 20, 2004 (3 pages).
USPTO Office Action for U.S. Appl. No. 10/194,186, Apr. 30, 2004 (7 pages).
USPTO Notice of Allowance and Fees Due for U.S. Appl. No. 10/194,186, Dec. 15, 2004 (4 pages).
USPTO Office Action for U.S. Appl. No. 10/194,019, Mar. 26, 2004 (7 pages).
USPTO Office Action for U.S. Appl. No. 10/194,019, Dec. 14, 2004 (10 pages).
USPTO Notice of Allowance and Fees Due for U.S. Appl. No. 10/194,019, Jan. 31, 2005 (4 pages).
"3 Quick Start," EverQuest Manual (3 pages), downloaded from http://eqlive.station.sony.com/manuaVprintfriendlydsp?chapter=3 on Sep. 13, 2005.
"Sony Online Entertainment and NCsoft Join Force to Expand EverQuest®," Game Development Search Engine, (2 pages) dated Jan. 23, 2002.
"Butterfly.net: Powering next-generation gaming with on-demand computing," mM case study on Butterfly.net, (12 pages), downloaded from http://www-306.ibm.com/software/success/cssdb.nsf7CSIAKLR-5GNU24?OpenDocument . . . on Sep. 20, 2005.
"Sony PlayStation 2 Online Adaptor," CNET.com, (4 pages). Release date Aug. 27, 2002.
"Playstation, Playstation 2," Answers.com (8 pages), downloaded from http://www.answers.com/main/ntqueryjsessionid=In07siu6tfvdv?method=48(dsid=22228d . . . on Sep. 8, 2005.
"E3 2002: All About Xbox Live," xbox.ign.com, (4 pages), May 20,2002.
"Encyclopedia: EverQuest," nationmaster.com (7 pages) , downloaded from http://www.nationmaster.com/encyclopedia/EverOuest on Sep. 15, 2005.
U.S. Appl. No. 60/305,148, filed Jul. 13, 2001, McDowell et al.
U.S. Appl. No. 60/305,146, filed Jul. 13, 2001, McDowell et al.
U.S. Appl. No. 60/305,147, filed Jul. 13, 2001, McDowell et al.
U.S. Appl. No. 60/305,149, filed Jul. 13, 2001, McDowell et al.
U.S. Appl. No. 60/305,150, filed Jul. 13, 2001, McDowell et al.
U.S. Appl. No. 60/305,151, filed Jul. 13, 2001, McDowell et al.
U.S. Appl. No. 60/323,597, filed Sep. 20, 2001, McDowell.
U.S. Appl. No. 60/323,598, filed Sep. 20, 2001, McDowell.

(56) References Cited

OTHER PUBLICATIONS

"Sony Online Entertainment Continues to Lead the Online Gaming Industry With Its New Roster of Massively Multiplayer Games," Press Releases at Sonyonline.com (2 pages) May 13, 2002.
"Middleware Partners, Working with Game Components Suppliers," Quazal Multiplayer Connectivity. (1 page), downloaded from http://www.quazal.comlmodules.php?op=modload&name-Sections &file=index&req=vie . . . on Sep. 13, 2005.
"Quazal Eterna, The Most Flexible Infrastructure for MMOG," Quazal Multiplayer Connectivity, (1 page), downloaded from http://www.quazal.comlmodules.php?op= modload&name-Sections &file=index&req=vie . . . on Sep. 13, 2005.
"Quazal Rendez-Vous, A Flexible and Powerful Lobby Solution," Quazal Multiplayer Connectivity, (2 pages), downloaded from http://www.quazal.comlmodules.php?op=modload&name-Sections &file=index&req=vie . . . on Sep. 15, 2005.
"Quazal Voice for Net-Z, Real-Time Voice Communications Made Easy," Quazal Multiplayer Connectivity, (1 page), downloaded from http://www.quazal.com/modules.php?op=modload&name-Sections &file=index&req=vie . . . on Sep. 13, 2005.
"Quazal SyncSim for Net-Z, Everything for Deterministic Simulations," Quazal Multiplayer Connectivity, (2 pages), downloaded from http://www.quazal.comlmodules.php?op=modload&name-Sections &file=index&req=vie . . . on Sep. 13, 2005.
"Quazal Net-Z, Simplifying Multiplayer Game Development," Quazal Multiplayer Connectivity (2 pages), downloaded from http://www.quazal.comlmodules.php?op= modload&name-Sections &file=index&req=vie . . . on Sep. 15, 2005.
"GameSpy Arcade—The Arcade for the Internet!," gamespy arcade, (11 pages), downloaded from http://www.gamespyarcade.com/features/ on Sep. 13, 2005.
"Encyclopedia: MMORPG," natiomaster.com, (10 pages), downloaded from http://www.nationmaster.comlencyclopedialMMORPG on Sep. 15, 2005.
"Online Gaming," PlayStation, (9 pages), downloaded from http://www.us.playstation.com/onlinegaming.aspx?id=index&p.=1 on Sep. 13, 2005.
"3rd Party Game Support," PlayStation, (5 pages) © 2005 Sony Computer Entertainment America Inc. 2005.
Myth II Soulblighter; <URL: http://public.planetmirror.com/ pub/replacementdocs/Myth_II_-Soulblighter—Manual—Pc. pdf>; 24 pages, Dated 1999.
European Examination Report for Application No. 02 764 684.3-2221; (4 pages) Oct. 12, 2004.
European Examination Report for Application No. 02 764684.3-2221; (4 pages) Jun. 17, 2005.
European Summons to Attend Oral Proceedings for Application No. 02 764684.3-2211; (26 pages) Feb. 14, 2006.
European Decision to Refuse a European Patent Application for Application No. 02 764 684.3-2211; (9 pages) Dec. 14, 2006.
USPTO Examiner's Answer to Appeal Brief for U.S. Appl. No. 10/193,980, Sep. 23, 2009 (14 pages).
USPTO Examiner's Answer to Appeal Brief for U.S. Appl. No. 11/335,253, Feb. 24, 2009 (15 pages).
USPTO Office Action for U.S. Appl. No. 12/131,516, Jan. 13, 2010 (13 pages).
USPTO Pre-Brief Appeal Conference Decision for U.S. Appl. No. 11/335210, Jun. 5, 2008 (2 pages).
USPTO Examiner's Answer to Appeal Brief for U.S. Appl. No. 11/335,210, Nov. 12, 2008 (12 pages).
USPTO Notification of Appeal Hearing for U.S. Appl. No. 11/335,210, Jul. 1, 2010 (2 pages).
International Preliminary Examination Report for International Application No. PCT/EP2002/007806, Aug. 11, 2003 (9 pages).
International Preliminary Examination Report for International Application PCT/EP02/07807, Aug. 19, 2003 (5 pages).
USPTO Office Action for Application No. 11/397596, Sep. 10, 2010 (11 pages).
Monopoly (Tm) Parker Brothers Real Estate Trading Game (C) 1997, Retrieved from http://www.hasbro.com/common/instrucUmonins.pdf on Sep. 9th, 2010 (6 pages).
USPTO Response to Reply Brief for U.S. Appl. No. 11/335,253, May 6, 2009 (3 pages).
USPTO Pre-Brief Appeal Conference Decision for U.S. Appl. No. 12/131,516, Jul. 22, 2010 (2 pages).
USPTO Notice of Allowance and Fees Due for U.S. Appl. No. 12/131,516, Mar. 18, 2011 (15 pages).
USPTO Office Action for U.S. Appl. No. 11/335,253, Sep. 15, 2011 (17 pages).
USPTO BPAI Decision for U.S. Appl. No. 11/335,210, Jun. 29, 2011 (12 pages).
USPTO Notice of Allowance and Fees Due for U.S. Appl. No. 11/397,596, Sep. 22, 2011 (8 pages).
USPTO Office Action for U.S. Appl. No. 12/760,185, Nov. 9, 2011 (7 pages).
USPTO Notice of Allowance and Fees Due for U.S. Appl. No. 11/335,210, Sep. 30, 2011 (12 pages).
USPTO Office Action for U.S. Appl. No. 12/258,297, Oct. 28, 2011 (12 pages).
USPTO Office Action for U.S. Appl. No. 11/335,253, Mar. 28, 2012 (19 pages).
USPTO Office Action for U.S. Appl. No. 11/335,210, Feb. 17, 2012 (9 pages).
USPTO Office Action for U.S. Appl. No. 12/497,668, Jan. 31, 2012 (7 pages).
Notice of Allowance and Fees Due for U.S. Appl. No. 12/258,297, May 11, 2012 (5 pages).
USPTO Office Action for U.S. Appl. No. 13/245,380, Apr. 6, 2012 (17 pages).
Tom Landry Strategy Football [online]. Home of the Underdogs [Retrieved from the Internet: <URL:http://squakenet.com/computer_games/6459/Tom-Landry-Strategy-Football/download.html>, printed Jul. 1, 2009.
USPTO Notice of Allowance and Fees Due for U.S. Appl. No. 12/760,185, Apr. 23, 2012 (8 pages).
USPTO Office Action for U.S. Appl. No. 11/335,210, Sep. 19, 2012 (12 pages).
USPTO Notice of Allowance and Fees Due for U.S. Appl. No. 12/258,297, May 11, 2012 (5 pages).
USPTO Notice of Allowance and Fees Due for U.S. Appl. No. 12/497,668, Sep. 18, 2012 (7 pages).
USPTO Office Action for U.S. Appl. No. 13/618,191, Feb. 22, 2013 (6 pages).
USPTO Office Action for U.S. Appl. No. 13/245,380, Nov. 5 2012 (18 pages).
USPTO Pre-Brief Appeal Conference Decision for U.S. Appl. No. 11/335,210, Apr. 24, 2013 (2 pages).
USPTO Office Action for U.S. Appl. No. 13/611,602, Apr. 2, 2013 (9 pages).
USPTO Office Action for U.S. Appl. No. 13/612,084, Mar. 29, 2013 (8 pages).

FIG. 5

SYSTEM AND METHOD FOR ADDING A SKILL ASPECT TO GAMES OF CHANCE

CROSS REFERENCE TO RELATED APPLICATIONS

This application is a continuation of U.S. patent application Ser. No. 11/397,596, filed Apr. 3, 2006, now U.S. Pat. No. 8,105,141, which is a continuation of U.S. patent application Ser. No. 10/193,817 filed Jul. 12, 2002, now U.S. Pat. No. 7,021,623, which claims the benefit of U.S. Provisional Application No. 60/305,148 filed Jul. 13, 2001. The disclosures of U.S. Ser. No. 11/397,596 and U.S. Ser. No. 10/193,817 are incorporated by reference herein in their entireties.

TECHNICAL FIELD OF THE INVENTION

The invention relates generally to games in which there is an aspect of chance due to moves being based on randomly-generated numbers and, more particularly, to adding an aspect of skill to such games by adding a level of predictability to the determination of the numbers on which moves will be based.

BACKGROUND OF THE INVENTION

Many conventional games are considered games of chance due to the fact that moves during the game are based on numbers that are randomly generated. For example, in backgammon, moves are made on the basis of the roll of a pair of dice. Typically, each die has six sides, each of which has one or more dots representing the numbers one through six. A roll of the pair of dice results in a combination of two numbers, each of the two numbers being any number from one through six. Although there are only a certain number of combinations for the pair of dice, any combination can occur on any roll. In backgammon, a player moves pieces based on this randomly-generated combination of numbers. If a player rolls a two-six combination, for instance, the player may move one piece two spikes (i.e., spaces) and another piece six spikes. Optionally, the player may move one piece eight (two plus six) spikes.

Thus, in the conventional backgammon game, as in many games, there exists a certain level of skill. The player must determine how best to use the number or numbers which are generated at the beginning of the player's turn. However, in conventional games, at the beginning of the player's turn, the player cannot predict with any certainty what the number or numbers will be which will govern how the player moves (or otherwise takes some action according to the rules of the particular game).

There is a known version of backgammon according to the rules of which a certain level of predictability is added regarding the numbers by which the players will make moves. According to this known variation, the dice are replaced by standard dominos. Twelve dominos per players are aligned on each player's respective side of the backgammon board. The dominos represent dice rolls, which is possible because a standard domino has a side with two halves, each half having dots representing numbers. Each player has the same number of dominos and both players can see all of the dominos, including the dominos to be used by the other player. The dominos can be used by the players in any order they choose. Once a group of the dominos is used, it is replaced by another group of twelve dominos.

SUMMARY OF THE INVENTION

The present invention is directed to a system and methods for removing a certain level of the chance aspect of a game or other application and adding a certain level of a skill. The game or application may involve a user that makes moves according to numbers provided by an indicator such as a die, for example.

In one embodiment, the method includes using an indicator to determine one or more numbers and advancing a number of positions corresponding to the one or more numbers. The using the indicator step may include activating the indicator a predetermined number of times to determine a first sequence of one or more move numbers. The advancing step may include advancing a first time by a number of positions corresponding to the first move number of the first sequence of move numbers and then advancing a second time by a number of positions corresponding to the second move number of the sequence of move numbers.

In another embodiment, the method includes using an indicator a first time to determine one or more numbers and advancing a number of positions corresponding to the one or more numbers. The using the indicator step may include activating the indicator a predetermined number of times to determine a first group of one or more move numbers. The advancing step may include advancing a first time by a number of positions corresponding to a first move number of the first group of move numbers. The method may further include using the indicator a second time to determine a substitute move number to replace the first move number of the first group of move numbers.

According to another embodiment a system is provided for executing a game or other application in which users make moves. The system may include a processor and an application operable to be executed by the processor. The application may be operable to perform any method, or a combination of methods, as described herein and/or within the scope of the present invention.

The invention encompasses additional variations, features, modifications, and the like and is not intended to be limited to the specific example embodiments described herein.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

The present invention provides for replacing a certain amount of the chance aspect of a game with a certain level of predictability. This increases the amount that skill affects the course and outcome of the game. The detailed description is based mainly on the example of backgammon. However, various embodiments have applicability to other games. Thus, various embodiments are intended to apply to any game in which moves (which may include movement of pieces, advancements, or any other type of player activity) are determined at least in part by the generation of a number or combination of numbers. As described herein, the generation of a number is intended to include the generation of a single number or multiple numbers such as a combination of numbers. A number can be generated by the activation of an indicator, such as a domino, a die (or multiple dice, such as a pair of dice), a computerized, random-number generator, or any other indicator, which can provide a number on which game moves can be based. The various embodiments also apply to any application in which a move is based on a number. Thus, the various embodiments also apply to applications that might not be strictly considered games.

Figure 1:
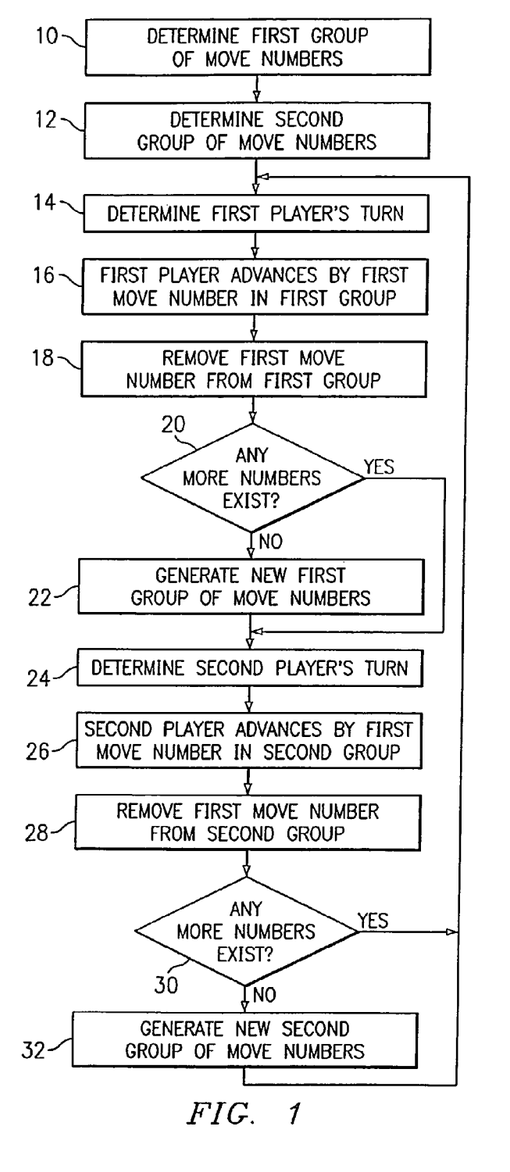
FIG. 1 is a flow chart representing a method in accordance with an embodiment of the present invention.

According to an embodiment of the invention, and in connection with FIG. 1, a method of playing a game is provided in which a certain level of the chance aspect of the game is replaced by a certain level of a skill aspect. According to the method, at step 10, an indicator is used to determine a first group of move numbers. At step 12, the indicator is used to determine a second group of move numbers. The first and second groups of move numbers each includes one or more move numbers. For example, each of the first and second groups of move numbers may include five move numbers. However, this is intended as an example only, and the groups of move numbers may include any predetermined number of move numbers. Preferably, the number of move numbers in the first group is equal to the number of move numbers in the second group. However, the number of move numbers in each group of move numbers can vary. In the example shown in FIG. 1, only two groups of move numbers are determined. This might be preferable, for instance, if there are two players in the game. However, more or fewer groups may be determined. For instance, it is possible for only one group of move numbers to be determined, even if there are two or more players. Alternatively, there may be more than two players and it might be desirable to have a number of groups of move numbers corresponding to the number of players. Further, the numbers in each group may be sequenced in the order in which they were determined by activation of the indicator.

At step 14, a first player's turn is determined. At step 16, the first player advances a first time by a number of positions corresponding to the first move number of the first group of move numbers. At step 18, the first move number used by the first player is removed from the first group of move numbers. At step 20, it is determined whether any more numbers exist in the first group of move numbers. If no more numbers exist, the method advances to step 22, where the indicator is used again to determine a new first group of move numbers. If at least one number still exists, then the method advances to step 24. At step 24, a second player's turn is determined. At step 26, the second player advances a first time by a number of positions corresponding to the first move number of the second group of move numbers. At step 28, the first move number used by the second player is removed from the second group of move numbers. At step 30, it is determined whether any more numbers exists in the second group of move numbers. If no more numbers exist, the method advances to step 32, where the indicator is used again to determine a new second group of move numbers. If at least one number still exists, then the method returns to step 14. The first player would then advance a second time by a number of positions corresponding to the second move number of the first group of move numbers. Play continues in this manner until one of the players wins the game.

Thus, the players know in advance at least a certain number of move numbers on which their moves will be based. Thus, an element of predictability is added, which in turn adds a skill aspect to the game.

Figure 2:
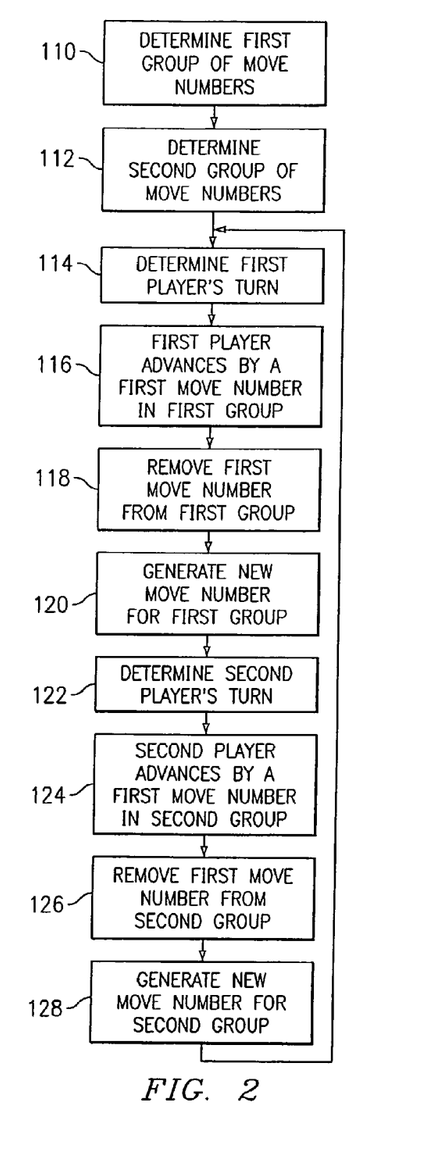
FIG. 2 is a flow chart representing a method in accordance with another embodiment of the present invention.

According to another embodiment, as depicted in FIG. 2, a method is provided, which is similar to that described in connection with the embodiment depicted in FIG. 1. At step 110, an indicator is used to determine a first group of move numbers. At step 112, the indicator is used to determine a second group of move numbers. In this embodiment, each group of move numbers may or may not be sequenced according to the order in which they were determined by activation of the indicator.

At step 114, a first player's turn is determined. At step 116, the first player advances a first time by a number of positions corresponding to a first move number selected from the one or more move numbers of the first group of move numbers. In the case where the move numbers are sequenced, the number selected would be the first move number of the sequence of move numbers in the first group. In the case where the move numbers are not sequenced, the number selected may be any of the move numbers of the first group. At step 118, the first move number selected by the first player is removed from the first group of move numbers. At step 120, the indicator is used to determine a new number to be included in the first group of move numbers. If the move numbers are sequenced, then the new number is added to the end of the sequence. If the numbers are not sequenced, then the new number is simply available for use by the first player as are all the rest of the numbers in the first group of move numbers. At step 122, a second player's turn is determined. At step 124 the second player advances a first time by a number of positions corresponding to a first move number selected from the one or more move numbers of the second group of move numbers. In the case where the move numbers are sequenced, then the number selected would be the first move number of the sequence of move numbers in the second group. In the case where the move numbers are not sequenced, the number selected may be any of the move numbers of the second group. At step 126, the first move number selected by the second player is removed from the second group of move numbers. At step 128, the indicator is used to determine a new number to be included in the second group of move numbers. If the move numbers are sequenced, then the new number is added to the end of the sequence. If the numbers are not sequenced, then the new number is simply available for use by the first player as are all the rest of the numbers in the second group of move numbers. The method then returns to step 114. Play continues until one of the player wins the game.

Figure 3:
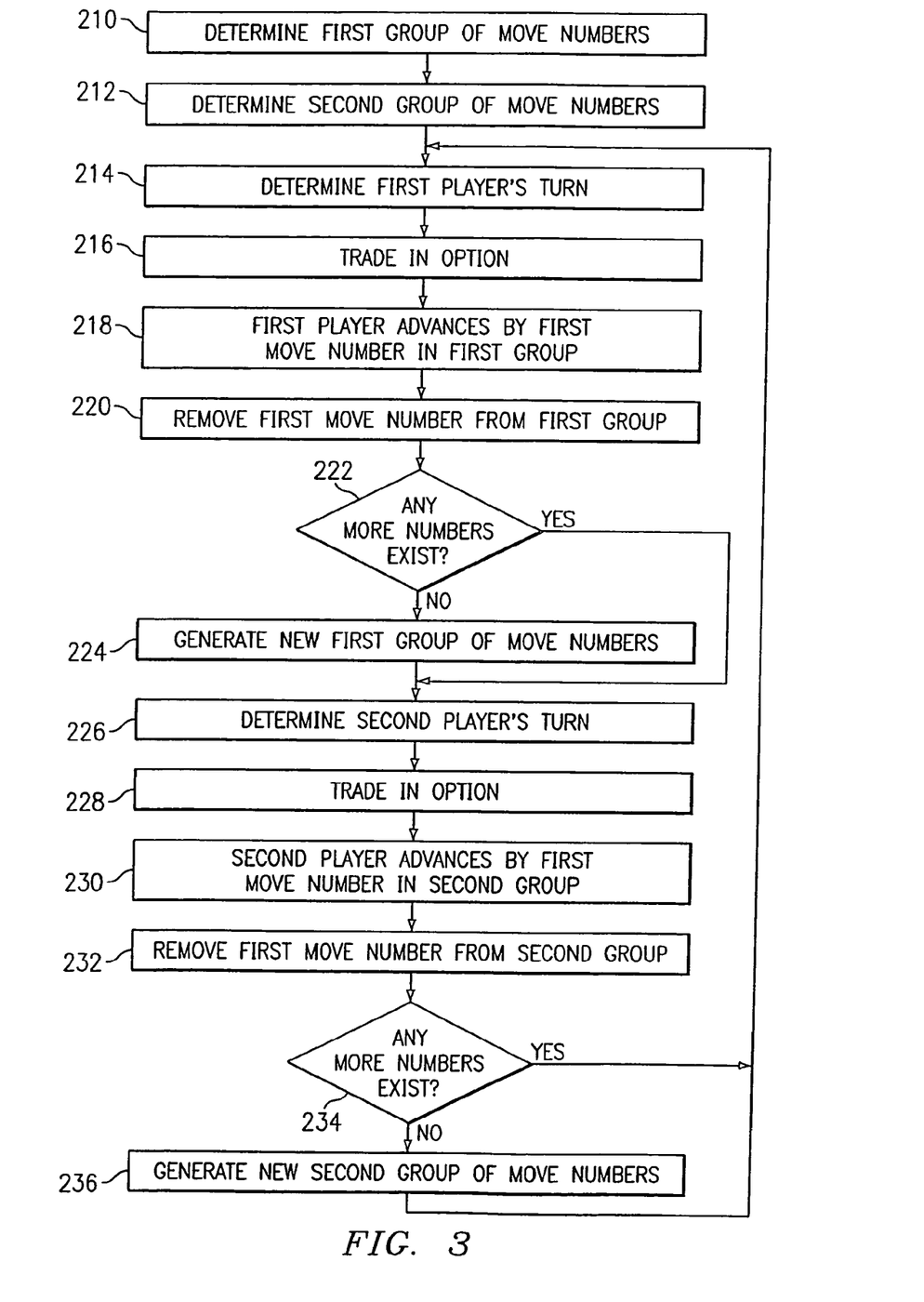
FIG. 3 is a flow chart representing a method in accordance with another embodiment of the present invention.

According to another embodiment, as depicted in FIG. 3, another method is provided. At step 210, an indicator is used to determine a first group of move numbers. At step 212, the indicator is used to determine a second group of move numbers. In this embodiment, each group of move numbers is preferably sequenced according to the order in which they were determined by activation of the indicator.

At step 214, a first player's turn is determined. At step 216, the first player may, at his option, trade in a certain number of move numbers from the first group of move numbers. The number of move number which may be traded in may be predetermined, or may be based on a certain criteria, such as how many moves the player has made or whether the first player is winning or losing. As an alternative, the first player may trade in up to a certain number of move numbers. The trading in of move numbers may be done in a manner similar to that of trading in cards in a draw poker game. The traded-in move numbers are replaced with substitute move numbers, which are thus added to the first group. Preferably, the number of substitute move numbers equals the number of traded-in move numbers. However, the number of substitute move numbers can be different from the number of traded-in move numbers.

At step 218, the first player advances a first time by a number of positions corresponding to the first move number of the first group of move numbers. At step 220, the first move number used by the first player is removed from the first group of move numbers. At step 222, it is determined whether any more move numbers exist in the first group of move numbers. If no more move numbers exist, the method advances to step 224 where the indicator is used again to determine a new first group of move numbers. If at least one move number still exists, then the method advances to step 226. At step 226, a second player's turn is determined. At step 228, the second player may, at his option, trade in a certain number of move numbers from the second group of move numbers. The same considerations apply here as in the case of the trading in option available to the first player as described above. At step 230, the second player advances a first time by a number of positions corresponding to the first move number of the second group of move numbers. At step 232, the first move number used by the second player is removed from the second group of move numbers. At step 234, it is determined whether any more move numbers exists in the second group of move numbers. If no more move numbers exist, the method advances to step 236, where the indicator is used again to determine a new second group of move numbers. If at least one move number still exists, then the method returns to step 218. The first player would then advance a second time by a number of positions corresponding to the second move number of the first group of move numbers. Play continues until one of the players wins the game.

Figure 4:
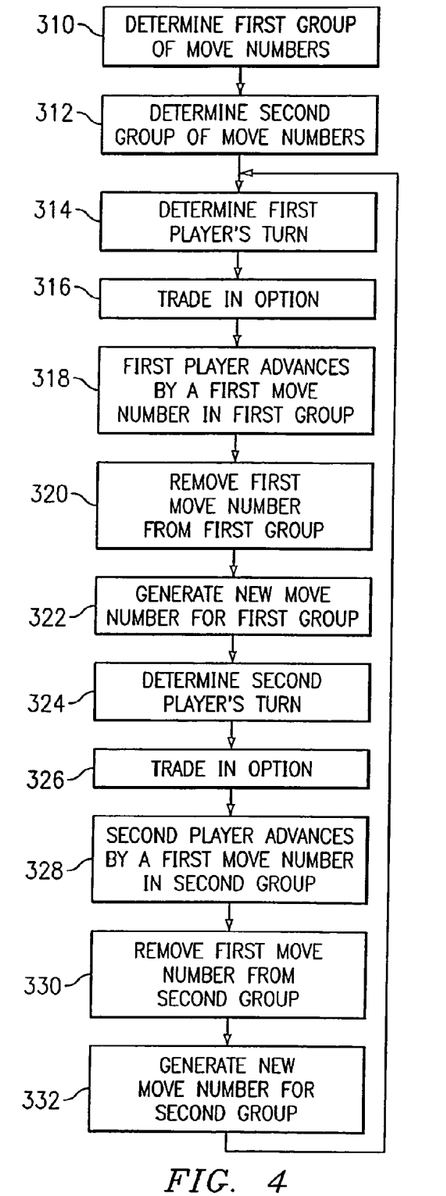
FIG. 4 is a flow chart representing a method in accordance with another embodiment of the present invention.

According to another embodiment, as depicted in FIG. 4, another method is provided that is similar to the method described in connection with FIG. 3. In this embodiment, at step 310, an indicator is used to determine a first group of move numbers. At step 312, the indicator is used to determine a second group of move numbers. In this embodiment, each group of move numbers may or may not be sequenced according to the order in which they were determined by activation of the indicator.

At step 314, a first player's turn is determined. At step 316, the first player may, at his option, trade in a certain number of move numbers from the first group of move numbers. In the case of sequenced move numbers, the substitute move numbers would preferably be located in the sequence in positions corresponding to the traded-in numbers they replace. Alternatively, they could be added to the sequence according to some other rule, such as being placed at the end in the order in which the substitute move numbers are determined or otherwise selected. In the case of a non-sequenced group of move numbers, the substitute move numbers are simply added to the group of move numbers to be available for moves as are any of the other move numbers within the group of move numbers.

At step 318, the first player advances a first time by a number of positions corresponding to a first move number selected from the one or more move numbers of the first group of move numbers. In the case where the numbers are sequenced, then the number selected would be the first move number of the sequence of move numbers in the first group. In the case where the numbers are not sequenced, the number selected may be any of the move numbers of the first group. At step 320, the first move number selected by the first player is removed from the first group of move numbers. At step 322, the indicator is used to determine a new move number to be included in the first group of move numbers. If the move numbers are sequenced, then the new move number is added to the end of the sequence. If the numbers are not sequenced, then the new move number is simply available for use by the first player as are all the rest of the move numbers in the first group of move numbers.

At step 324, a second player's turn is determined. At step 326, the second player may, at his option, trade in a certain number of move numbers from the first group of move numbers. The same considerations for trading in move numbers apply here as discussed above. At step 328, the second player advances a first time by a number of positions corresponding to a first move number selected from the one or more move numbers of the second group of move numbers. In the case where the move numbers are sequenced, then the move number selected would be the first move number of the sequence of move numbers in the second group. In the case where the move numbers are not sequenced, the move number selected may be any of the move numbers of the second group. At step 330, the first move number selected by the second player is removed from the second group of move numbers. At step 332, the indicator is used to determine a new move number to be included in the second group of move numbers. If the move numbers are sequenced, then the new move number is added to the end of the sequence. If the numbers are not sequenced, then the new move number is simply available for use by the first player as are all the rest of the move numbers in the second group of move numbers. The method then returns to step 318. Play continues until one of the player wins the game.

According to another embodiment, any of the methods described herein may be employed, except that the numbers determined by the indicator are not immediately revealed to the players. For example, if the method described in connection with FIG. 1 is employed, at steps 10 and 12, respectively, the indicator is used to determine first and second groups of move numbers. However, none of the move numbers is visible to either player until it is a player's turn to move. When it is determined, for instance, that it is the first player's turn to move for the first time, the first move number in the sequence would then be made visible to the players. None of the other move numbers of either the first or second groups of move numbers would be visible; although, they would already be determined. In an embodiment in which the groups of move numbers were not sequenced, the player would select one of the determined (yet not visible) move numbers. Then that move number would be made visible to the players. If dominos were being used as an indicator, for example, the dominos would be selected, but would remain face down until a player chose one for a given move.

According to another embodiment, a game or other application is provided. The game or other application comprises rules to implement any of the methods describe herein.

Figure 5:
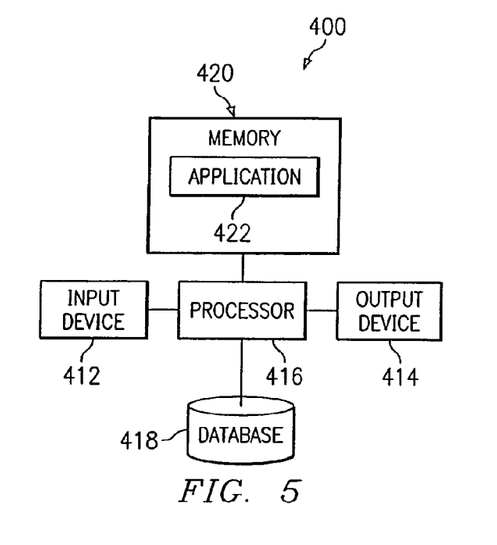
FIG. 5 is a system operable to implement the methods of FIGS. 1-4, and variations thereof, in accordance with an embodiment of the present invention.

According to another embodiment, a system is provided for implementing a game or other application which, in turn, implements any of the methods described herein. Preferably, as depicted in FIG. 5, the system 400 comprises an input device 412, an output device 414, a processor 416, a database 418, and memory 420. Input device 412 may include a pointing device such as a mouse, a track pad, a keyboard, and the like. Also, input device 412 may include a combination of these devices. Output device 414 may include a monitor, a printer, and the like, or any combination of such devices. Output device 414 is preferably operable to provide indications of moves, status, options, and any other relevant game or application information that may be useful to a user (or player).

Memory 420 includes computer software that my be executed by processor 416. The computer software may generally be identified by modules in memory 20. It will be understood that the computer software may be otherwise combined and/or divided for processing within the scope of the present invention. While only one processor is depicted, it should be understood that system 400 may comprise multiple processors. Further, any appropriate software platform may be utilized including functional or object-oriented programming.

The computer software may be loaded into memory 420 from disk storage (not explicitly shown). Disk storage may include a variety of types of storage media. For example, disk storage may include floppy disk drives, hard disk drives, CD or DVD drives, magnetic tape drives, or any other suitable storage media.

Database 418 preferably includes computer records that may be generally identified by tables. It will be understood that the computer records may be otherwise combined and/or divided within the scope of the present invention.

Preferably, one or more applications 422 are provided and are operable to be executed by processor 416. An application (s) 422 is preferably operable to perform any of the methods described herein, or any combination thereof, with input provided by a user (e.g., a player) through input device 412.

System 400 may be any type of computer system or other type of system operable to implement at least one of the methods described herein. System 400 may be an Internet- or Web-based system, for example, in which the application 422 might be executed on a server. It will be understood that system 400 may be otherwise configured within the scope of the present invention. For example, system 400 may operate as a stand alone system or may operate as a client-server networked system. Also, system 400 may operate in a network environment such as a LAN, WAN, intranet, extranet, or Internet.

In an alternative embodiment to any of the methods described above, system 400 automatically generates move numbers, and presents move numbers, or options (such as trading in move numbers) to a user. In another alternative embodiment to any of the methods described above, system 400 can automatically ensure that the total of the move numbers of one group of move numbers equals the total of any other group of move numbers. This ensures that each player has essentially the same total number of available moves, thereby further replacing a chance aspect with an aspect of skill. Optionally, system 400 can ensure that the total of move numbers of one group are within a predetermined range of the total of move numbers of another group.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A system comprising:
   at least one processor; and
   at least one memory having instructions stored thereon which, when executed by the at least one processor, direct the at least one processor to perform a method comprising:
   determining a first sequence of move numbers comprising a plurality of non-zero numbers;
   after the first sequence is determined, causing a first player of a game to advance a first time, in a first turn of the first player, by a number of positions corresponding to a move number of the first sequence of move numbers;
   after causing the first player to advance the first time, causing a second player of the game to advance in a first turn of the second player; and
   after causing the second player to advance, causing the first player to advance a second time, in a subsequent turn of the first player, by a number of positions corresponding to another move number of the first sequence of move numbers.

2. The system of claim 1, wherein the first move number of the first sequence is not used to cause any player of the game to advance more than once during advancements corresponding to the first sequence of move numbers.

3. The system of claim 1,
   wherein the act of determining a first sequence of move numbers comprises activating an indicator a predetermined plurality of times, and
   wherein the indicator comprises at least one of (i) one or more die and (ii) one or more dominos.

4. The system of claim 1,
   wherein the act of determining a first sequence of move numbers comprises activating an indicator a predetermined plurality of times, and
   wherein the indicator comprises a random-number generator.

5. The system of claim 1, wherein each player participates in the game by taking turns, and wherein one or more move numbers of the first sequence of move numbers is visible to a respective player at times during the game other than the respective player's turn.

6. The system of claim 1, wherein a user participates in the game by taking turns, and wherein move numbers are invisible to the user until selected by the user upon the user's turn.

7. The system of claim 1, in which the method further comprises:
   receiving from the first user a request to exchange one or more move numbers for one or more substitute move numbers; and
   exchanging one or more move numbers for one or more substitute move numbers.

8. The system of claim 1,
   in which the act of determining a first sequence of move numbers comprises activating an indicator a predetermined plurality of times, and
   in which the method further comprises activating the indicator a predetermined number of times to determine a second sequence of one or more move numbers.

9. The system of claim 8, wherein the total of the move numbers of the first sequence of move numbers is within a predetermined range of the total of the move numbers of the second sequence of move numbers.

10. The system of claim 8, wherein the total of the move numbers of the first sequence of move numbers equals the total of the move numbers of the second sequence of move numbers.

11. A system comprising:
    at least one processor; and
    at least one memory having instructions stored thereon which, when executed by the at least one processor, direct the at least one processor to perform a method comprising:
    determining a first group of move numbers comprising a plurality of numbers;
    after the first group of move numbers is determined, causing a first player of a game to advance a first time, in a first turn, by a number of positions corresponding to a first move number of the first group of move numbers;

during the first turn, determining one or more substitute move numbers;

receiving a request to replace one or more of the move numbers of the first group of move numbers with one or more of the substitute move numbers; and responsive to the request, replacing one or more of the move numbers of the first group of move numbers with one or more of the substitute move numbers.

12. The system of claim 11,
wherein the act of determining the first group of move numbers comprises activating an indicator a predetermined plurality of times, and
wherein the act of activating the indicator a second time is accomplished after the act of advancing a first time.

13. The system of claim 12, further comprising causing the first player to advance a second time by a number of positions corresponding to a second move number of the first group of move numbers.

14. The system of claim 11, wherein the first group of move numbers comprises a sequence of a plurality of move numbers.

15. The system of claim 11,
wherein the act of determining the first group of move numbers comprises activating an indicator a predetermined plurality of times, and
wherein the indicator comprises at least one of (i) one or more die and (ii) one or more dominos.

16. The system of claim 11,
wherein the act of determining the first group of move numbers comprises activating an indicator a predetermined plurality of times, and
wherein the indicator comprises a random-number generator.

17. The system of claim 11, wherein each player participates in the game by taking turns, and wherein one or more move numbers of the first group of move numbers is visible to a respective player at times during the game other than the respective player's turn.

18. The system of claim 11, wherein a each player participates in the game by taking turns with other players, and wherein move numbers are invisible to a respective player until selected by the respective player upon the respective player's turn.

19. The system of claim 11, in which the method further comprises exchanging one or more move numbers for one or more substitute move numbers.

20. The system of claim 11,
in which the act of determining the first group of move numbers comprises activating an indicator a predetermined plurality of times, and
in which the method further comprises activating the indicator a predetermined number of times to determine a second group of one or more move numbers.

21. The system of claim 20, wherein the total of the move numbers of the first group of move numbers is within a predetermined range of the total of the move numbers of the second group of move numbers.

22. The system of claim 20, wherein the total of the move numbers of the first group of move numbers equals the total of the move numbers of the second group of move numbers.

23. A system comprising:
at least one processor; and
at least one memory having instructions stored thereon which, when executed by the at least one processor, direct the at least one processor to perform a method comprising:

prior to a move by a first user in a game, determining a plurality of move numbers for the first user;

causing the first user to advance a first time by a number of positions corresponding to at least one of the plurality of move numbers;

after causing the first user to advance a first time, determining one or more substitute move numbers;

receiving a request to exchange at least one of the plurality of move numbers with at least one of the one or more substitute move numbers; and responsive to the request, exchanging at least one of the plurality of move numbers with at least one of the one or more substitute move numbers.

24. The system of claim 23,
wherein the act of determining a plurality of move numbers for the first user comprises activating an indicator a predetermined number of times;
wherein the act of determining one or more substitute move numbers comprises activating the indicator to determine one or more substitute move numbers;
wherein the act of activating the indicator a predetermined number of times results in a first plurality of move numbers,
wherein the act of activating the indicator to determine one or more substitute move numbers results in a second plurality of move numbers, and
wherein the act of causing the first user to advance comprises causing the first user to advance a first time by a number of positions prior to the act of activating the indicator to determine one or more substitute move numbers.

25. The system of claim 24, in which the method further comprises:
communicating the first sequence of move numbers to the first player during the game, in which the first sequence of move numbers are not communicated to the second player during the game.

26. The system of claim 24, in which the method further comprises:
communicating the first sequence of move numbers to the first player and the second player during the game.

27. The system of claim 24, in which the method further comprises:
wherein the act of determining a plurality of move numbers for the first user comprises activating an indicator a predetermined number of times;
wherein the act of determining one or more substitute move numbers comprises activating the indicator to determine one or more substitute move numbers; and
before the act of causing a player to advance by the number of positions, causing at least one indicator representing the plurality of numbers to be displayed to the first player and the second player.

28. The system of claim 24, in which the request is received from the first player, and in which the method further comprises:
before replacing the one or more of the move numbers, determining a number of move numbers of the first group which may be replaced based on at least one of (i) how many moves the first player has made prior to receiving the request and (ii) whether the first player is winning or losing the game at the time the request is received.

29. A method comprising:
determining, by at least one processor, a first sequence of move numbers comprising a plurality of non-zero numbers;

after the first sequence is determined, causing, by the at least one processor, a first player of a game to advance a first time, in a first turn of the first player, by a number of positions corresponding to a move number of the first sequence of move numbers;

after causing the first player to advance the first time, causing, by the at least one processor, a second player of the game to advance in a first turn of the second player; and after causing the second player to advance, causing, by the at least one processor, the first player to advance a second time, in a subsequent turn of the first player, by a number of positions corresponding to another move number of the first sequence of move numbers.

30. A method comprising:

determining, by at least one processor, a first group of move numbers comprising a plurality of numbers;

after the first group of move numbers is determined, causing, by at least one processor, a first player of a game to advance a first time, in a first turn, by a number of positions corresponding to a first move number of the first group of move numbers;

during the first turn, determining, by the at least one processor, one or more substitute move numbers;

receiving, by the at least one processor, a request to replace one or more of the move numbers of the first group of move numbers with one or more of the substitute move numbers; and responsive to the request, replacing, by the at least one processor, one or more of the move numbers of the first group of move numbers with one or more of the substitute move numbers.

31. A method comprising:

prior to a move by a first user, determining, by at least one processor, a plurality of move numbers for the first user;

causing, by the at least one processor, the first user to advance a first time by a number of positions corresponding to at least one of the plurality of move numbers;

after causing the first user to advance a first time, determining, by the at least one processor, one or more substitute move numbers;

receiving, by the at least one processor, a request to exchange at least one of the plurality of move numbers with at least one of the one or more substitute move numbers; and responsive to the request, exchanging, by the at least one processor, at least one of the plurality of move numbers with at least one of the one or more substitute move numbers.

* * * * *